Nov. 15, 1949  G. E. DATH  2,488,005
FRICTION SHOCK ABSORBING MECHANISM
Filed June 20, 1945  2 Sheets-Sheet 1

Inventor:
George E. Dath.
By Henry Fuchs.
Atty.

Nov. 15, 1949     G. E. DATH     2,488,005
FRICTION SHOCK ABSORBING MECHANISM
Filed June 20, 1945     2 Sheets-Sheet 2
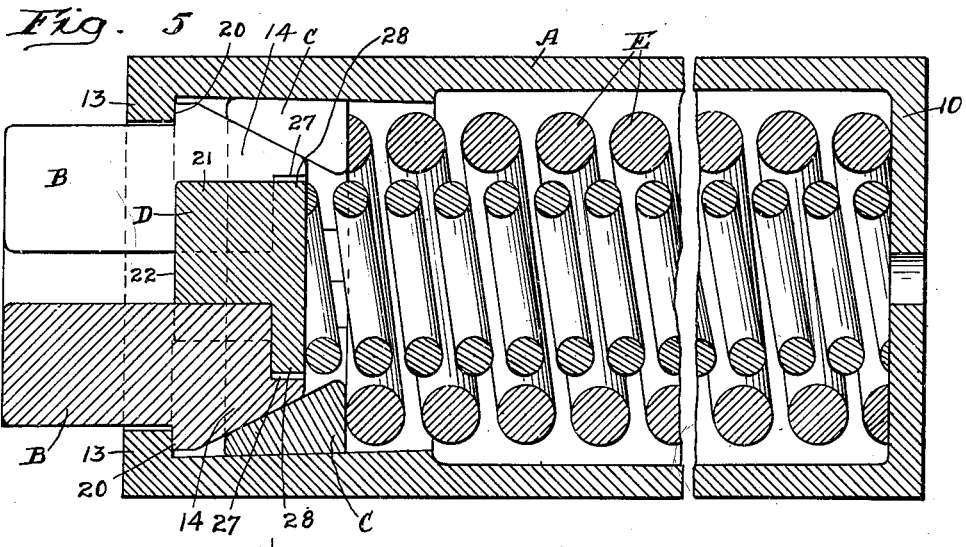
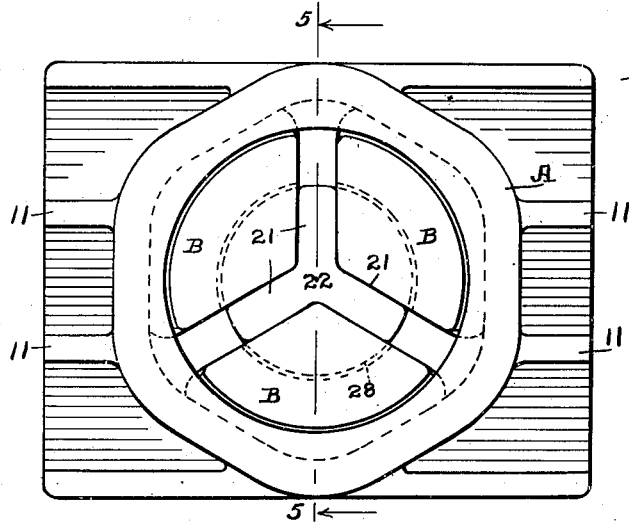
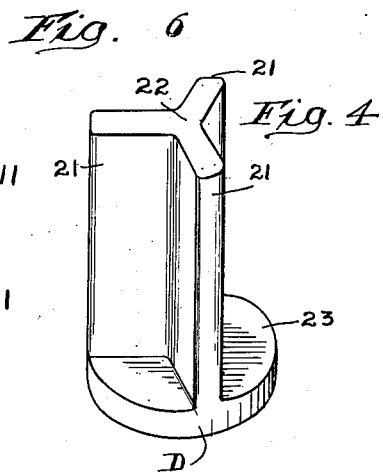
Inventor:
George E. Dath.
By Henry Fuchs
Atty.

Patented Nov. 15, 1949

2,488,005

UNITED STATES PATENT OFFICE 2,488,005

FRICTION SHOCK ABSORBING MECHANISM

George E. Dath, Mokena, Ill., assignor to W. H. Miner, Inc., Chicago, Ill., a corporation of Delaware Application June 20, 1945, Serial No. 600,572

4 Claims. (Cl. 213—34)

1

This invention relates to improvements in friction shock absorbing mechanisms.

The main object of this invention is to provide a friction shock absorbing mechanism, especially adapted for draft riggings of railway cars, comprising a friction casing closed at one end and open at the other end, a friction clutch including a central expandible wedge member and friction shoes surrounding the wedge member, and a spring resistance within the casing opposing movement of the clutch inwardly of the casing, wherein the spring resistance and clutch are insertable through the open end of the casing, and the parts are held assembled by shouldered engagement of the wedge member with the casing, the shouldered engagement of the wedge member and casing being effected by simple and efficient spreading means which holds the wedge member in expanded condition.

A more specific object of the invention is to provide a friction shock absorbing mechanism as specified in the preceding paragraph, wherein the expandible wedge member is split radially to provide a plurality of sections, and the spreading means comprises a central filler member or plug holding the wedge member expanded and having radially disposed wings or flanges engaged between adjacent sections of the wedge to effectively hold the sections against circumferential displacement and tilting.

Other objects of the invention will more clearly appear from the description and claims hereinafter following.

Figure 1:
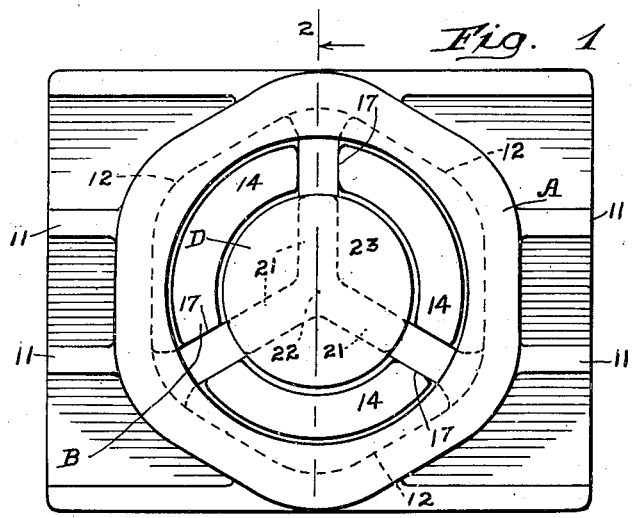
Figure 2:
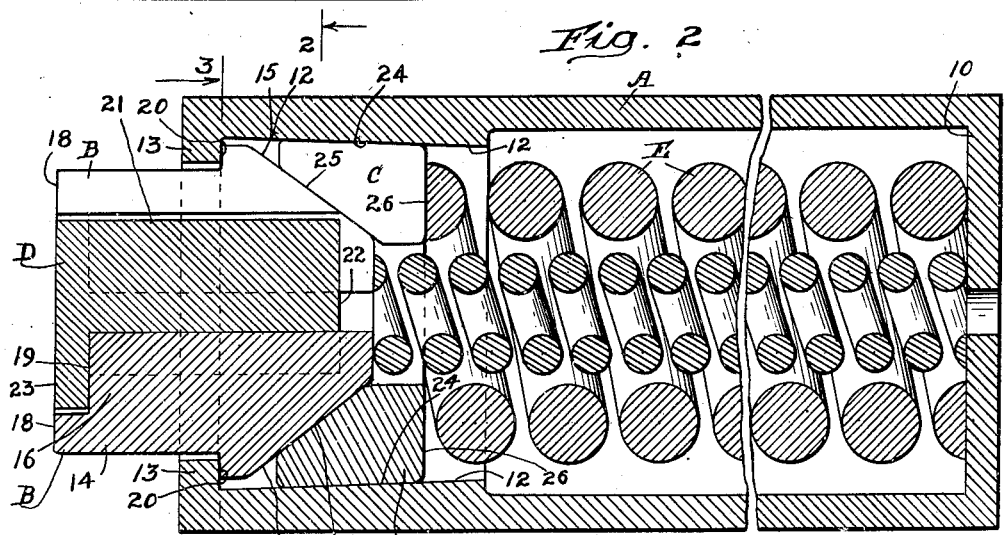
Figure 3:
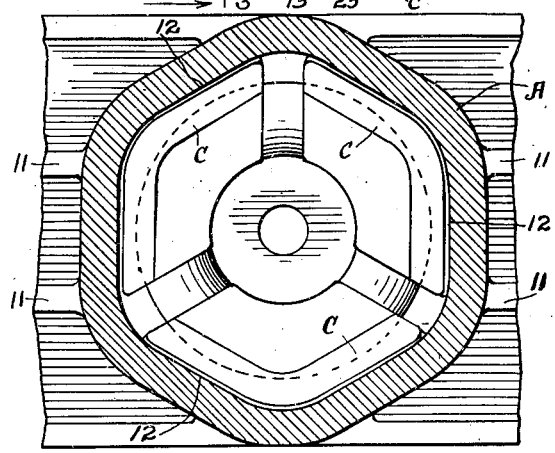

In the drawings forming a part of this specification, Figure 1 is a front elevational view of a friction shock absorbing mechanism embodying my improvements. Figure 2 is a vertical, longitudinal sectional view, corresponding substantially to the line 2—2 of Figure 1. Figure 3 is a transverse, vertical sectional view, corresponding substantially to the line 3—3 of Figure 2, with the wedge member removed. Figure 4 is a detail perspective view of the filler member for the sectional wedge shown in Figures 1, 2, and 3. Figure 5 is a view, similar to Figure 2, illustrating another embodiment of the invention, the section being taken on the line 5—5 of Figure 6. Figure 6 is a front elevational view of Figure 5, looking from left to right in said figure.

Referring first to the embodiment of the invention illustrated in Figures 1, 2, 3, and 4, my improved friction shock absorbing mechanism comprises broadly a casing A; a three piece, split wedge block B; three friction shoes C—C—C; a

2 spreading or filler member D; and a spring resistance E.

The casing A is of substantially hexagonal, interior and exterior cross section, having the friction shell section at the forward end, which is open, and the spring cage section at the rear end thereof. The casing A is closed at the rear end by a transverse, vertical wall 10, which projects at opposite sides beyond the side walls of the casing to provide a rear follower member of rectangular outline, which is integral with the casing. The follower member is reenforced by the usual webs 11—11 formed integral with the same and the casing side walls. The friction shell section of the casing presents three interior friction surfaces 12, which extend lengthwise of the casing and converge inwardly. Each friction surface 12 is of V-shaped transverse cross section, said V-shaped surface being formed by two adjacent, angularly disposed walls of the hexagonal casing. At the open front end thereof, the casing A has an inturned retaining flange 13, which provides a circular opening.

The wedge block B is radially divided into three similar sections 14—14—14. At the inner end, the wedge block B has three inwardly converging, flat wedge faces 15, which are disposed symmetrically about the central, longitudinal axis of the mechanism, each flat wedge face 15 being formed on one of the sections 14 of the block. At the forward end, the wedge block B is reduced in transverse cross section, as indicated at 16, said reduced portion being of cylindrical cross section, in effect, forming a shank member. The reduced cylindrical portion 16 of the wedge is of such a size as to loosely fit within the circular opening formed by the flange 13 of the casing. The radially extending side faces of the sections 14—14—14 of the radially split block B are substantially flat, as indicated at 17, and, in the expanded condition of the wedge block, the opposed faces 17—17 of adjacent sections are laterally spaced apart, as shown in Figure 1. The forward end of the block B is substantially flat, thus presenting a vertically disposed face 18 adapted to be engaged by the usual front follower of the railway draft rigging. The face 18 of the block B is centrally recessed, as indicated at 19, to provide a seat or pocket. The seat or pocket 19 is of circular outline and is formed partly on each section 14 of the block B. The reduced front end portion 16 of the split wedge block provides a retaining projection forwardly of the wedge faces 15—15—15 thereof, said retaining projection being formed by shoulders 20—20—20 on the sections 14—14—14 respectively of said wedge block. In the expanded condition of the wedge block, the shoulders 20—20—20 of the three sections thereof engage in back of the flange 13 of the casing to limit outward movement of the wedge. The sections 14—14—14 of the block are so proportioned and of such size that, in the collapsed condition, the block will pass freely through the opening of the casing defined by the flange 13.

The spreading or filler member D is in the form of a plug comprising three platelike sections or wings 21—21—21 radial to the central longitudinal axis of the mechanism. The wings 21 are spaced equal distances apart and merge at the center to form a shank portion 22. Each of the platelike sections or wings 21 is of such a thickness that it fills the space between two adjacent sections 14—14 of the wedge block B in the expanded condition of the latter, and said flanges, together with the sections of the wedge block, form, in effect, a complete and solid wedge member. At the forward end thereof, the spreading member D is provided with a disclike head 23 of circular outline, adapted to seat in the recess or pocket 19 of the split wedge block B and has its outer face flush with the end face 18 of said block.

The friction shoes C, which are three in number, are interposed between the wedge block B and the interior friction surfaces 12—12—12 of the casing. Each shoe has a longitudinally extending friction surface 24 on the outer side thereof, which is of V-shaped, transverse cross section and engages the corresponding V-shaped surface 12 of the casing. On the inner side, each shoe has a flat wedge face 25, correspondingly inclined to and engaging with the wedge face 15 of one of the sections 14 of the wedge block B. At the rear end, each shoe has a flat, transverse face 26, which forms an abutment for the front end of the spring resistance E.

The spring resistance E comprises a relatively heavy outer coil and a lighter inner coil. The coils of the spring resistance have their rear end bearing on the end wall 10 of the casing. The inner spring has its front end bearing directly on the inner end of the wedge block B and the outer coil has its front end bearing on the flat, transverse rear end faces 26 of the shoes C.

In assembling the mechanism, the spring resistance E and the friction shoes C—C—C are first placed within the casing A by inserting these parts through the open front end of the casing. With the casing standing on end, the split wedge block B in contracted or collapsed condition is inserted within the front end of the casing, being forced inwardly to an extent that the retaining shoulders 20—20—20 thereof are disposed rearwardly of the flange 13 of the casing. The filler member or plug D is then forcibly inserted between the sections of the wedge block B, thereby spreading the same apart and bringing the shoulders 20—20—20 into engagement with the flange 13 in back of the latter. As will be evident, when the mechanism is completely assembled the wedge is locked against outward movement with respect to the casing by the shouldered engagement between these parts, and the filler member D maintains the wedge in its expanded condition, the wings 21—21—21 completely filling the spaces between the sections 14—14—14 of the wedge, thus preventing relative tilting movement of these sections.

The operation of my improved shock absorbing mechanism as disclosed in Figures 1 to 4 inclusive is as follows: Upon inward movement of the wedge B with respect to the casing A being produced due to the compression of the mechanism, the spring resisted friction shoes are wedged apart and carried inwardly of the mechanism compressing the spring resistance E. High frictional resistance is thus produced between the friction surfaces of the shoes and casing. Upon the actuating force being reduced, the expansive action of the spring resistance E returns all of the parts to the normal position shown in Figure 2, outward movement of the wedge being limited by the shouldered engagement of the flanges or shoulders 20—20—20 thereof with the flange 13 of the casing A.

Referring next to the embodiment of the invention illustrated in Figures 5 and 6, the construction is the same as that disclosed in Figures 1 to 4 inclusive, with the exception that the spreading member of the sectional wedge is disposed at the rear end of the wedge. The parts of the mechanism shown in Figures 5 and 6, which are similar to the corresponding parts shown in Figures 1 to 4 inclusive, are indicated by the same reference characters as used in connection with Figures 1 to 4 inclusive.

As shown in Figures 5 and 6, the split wedge block B has a pocket or seat 27 at the rear end thereof which is of circular outline and is formed partly in each section 14 of said block, and the spreading member D has a disclike head 28, which is seated in the pocket 27. The head 28 has its vertical rear face flush with the inner ends of the sections 14—14—14 of the wedge and forms, in effect, a spring follower on which the front end of the inner coil of the spring resistance E bears.

In assembling the mechanism shown in Figures 5 and 6, the spring resistance E, the spreading member D, and the shoes C—C—C are first placed within the casing A by inserting these parts through the open front end of said casing. With the casing standing on end, the split wedge block B in collapsed condition is forced inwardly through the open end of the casing, thereby forcing the spreading member D and the shoes C—C—C inwardly against the resistance of the spring resistance E. When the wedge has been forced inwardly to a sufficient extent to bring the shoulders 20—20—20 thereof rearwardly of the flange 13 of the casing, the wedge is forcibly expanded to bring the shoulders 20—20—20 thereof into engagement with the flange 13 in back of the same. When the wedge has been completely expanded, the filler member D is projected forwardly by the central coil of the spring, engaging the wings of said filler member between the sections of the wedge and thereby maintaining the latter in expanded condition.

The operation of the mechanism illustrated in Figures 5 and 6 is the same as that described in connection with the mechanism illustrated in Figures 1 to 4 inclusive.

I claim:

1. In a friction shock absorbing mechanism, the combination with a friction casing open at one end and having an inturned stop flange at said open end; of a friction clutch, said clutch including a plurality of friction shoes having sliding frictional engagement with the interior of said casing, and a radially split, sectional, collapsible wedge block having wedging engagement with said shoes, each of said sections of said wedge block having a laterally projecting flange, said flanges, in expanded condition of the wedge block, being engaged in back of the flange of the casing to limit outward movement of the wedge block; a spreading member for holding said sectional wedge expanded with the flanges thereof in position to engage said flange of the casing, said spreading member having radially extending wings engaged between adjacent sections of said wedge block; and spring means yieldingly resisting inward movement of said clutch.

2. In a friction shock absorbing mechanism, the combination with a friction casing open at one end and having an inturned stop flange at said open end; of a plurality of friction shoes having sliding frictional engagement with the interior of said casing; a radially split, collapsible, sectional, central wedge block having wedging engagement with said shoes, each of the sections of said block having a laterally projecting flange, said flanges, in expanded condition of the block, being engageable in back of the flange of the casing to limit outward movement of the block; spring resistance means within the casing; and a plug for holding said sections of the wedge spread apart, with the flanges thereof in position to engage said flange of the casing to limit outward movement of the wedge block, said plug having a plurality of radially extending wings thereon engaged between adjacent sections of said wedge block, and a follower plate member at the rear ends of said wings bearing on said spring resistance.

3. In a friction shock absorbing mechanism, the combination with a friction casing open at one end and having an inturned stop flange at said open end; of a friction clutch telescoped within the open end of the casing, said clutch including a plurality of friction shoes having sliding frictional engagement with the interior of said casing, and a lengthwise divided, radially split, collapsible wedge block having wedging engagement with the shoes, said block having a pocket at its front end, the sections of said block having laterally extending stop projections engageable in back of the flange of the casing, in the expanded condition of said block, to limit outward movement of said block; a spreading member having a head at its outer end seated in said pocket of the wedge block, said spreading member having a stem portion extending between the sections of the wedge block to hold the latter spread apart with the stop projections thereof in position to engage said flange of the casing, said stem portion of the spreading member having wings inwardly of said head, projecting radially therefrom, engaged and fitting between adjacent sections of said wedge block to hold said sections against relative rotary displacement with respect to each other; and spring means yieldingly opposing movement of said clutch inwardly of the casing.

4. In a friction shock absorbing mechanism, the combination with a friction casing open at one end and having stop shoulders at said open end; of a friction clutch within said casing including a three piece, radially split, sectional, collapsible wedge block and friction shoes, each of the sections of said block having a lateral projection, said projections in the expanded condition of the wedge block being engageable in back of said shoulders of the casing to limit outward movement of the wedge block, said friction shoes having sliding engagement with the interior walls of the casing and wedging engagement with said wedge block; spring means opposing inward movement of the clutch; and a spreading member between said sections of the wedge for holding the wedge expanded, with the lateral projections thereof in position to engage said shoulders of the casing to limit outward movement of the wedge block, said member having three radially disposed, platelike wings engaged and fitting between adjacent sections of said radially split wedge block.

GEORGE E. DATH.

REFERENCES CITED

The following references are of record in the file of this patent:

UNITED STATES PATENTS

| Number | Name | Date |
|---|---|---|
| 2,236,596 | Hazeltine | Apr. 1, 1941 |
| 2,348,913 | Lehman | May 16, 1944 |
| 2,370,291 | Dath | Feb. 27, 1945 |